United States Patent
Lu et al.

(10) Patent No.: US 11,290,372 B2
(45) Date of Patent: Mar. 29, 2022

(54) METHOD AND DEVICE FOR ESTABLISHING MULTI-DOMAIN DUAL-HOME PATH

(71) Applicant: XI'AN ZHONGXING NEW SOFTWARE CO., LTD., Shaanxi (CN)

(72) Inventors: Gang Lu, Shenzhen (CN); Feng Shi, Shenzhen (CN)

(73) Assignee: XI'AN ZHONGXING NEW SOFTWARE CO., LTD.

( * ) Notice: Subject to any disclaimer, the term of this patent is extended or adjusted under 35 U.S.C. 154(b) by 807 days.

(21) Appl. No.: 15/322,173

(22) PCT Filed: Oct. 13, 2014

(86) PCT No.: PCT/CN2014/088513
§ 371 (c)(1),
(2) Date: Apr. 12, 2017

(87) PCT Pub. No.: WO2015/196631
PCT Pub. Date: Dec. 30, 2015

(65) Prior Publication Data
US 2017/0257307 A1 Sep. 7, 2017

(30) Foreign Application Priority Data
Jun. 27, 2014 (CN) .......................... 201410299727.4

(51) Int. Cl.
*H04L 12/707* (2013.01)
*H04L 12/715* (2013.01)
(Continued)

(52) U.S. Cl.
CPC .............. *H04L 45/24* (2013.01); *H04L 45/02* (2013.01); *H04L 45/04* (2013.01); *H04L 45/128* (2013.01);
(Continued)

(58) Field of Classification Search
CPC ............. H04L 65/4092; H04L 49/9005; H04L 65/4076; H04L 65/60; H04L 65/80; H04L 67/104
See application file for complete search history.

(56) References Cited

U.S. PATENT DOCUMENTS

| | | | |
|---|---|---|---|
| 2006/0171320 A1* | 8/2006 | Vasseur | H04L 45/44 370/238 |
| 2012/0195229 A1* | 8/2012 | Chen | H04L 45/12 370/254 |

(Continued)

FOREIGN PATENT DOCUMENTS

| | | |
|---|---|---|
| CN | 100454841 C | 1/2009 |
| CN | 102195869 A | 9/2011 |

(Continued)

OTHER PUBLICATIONS

International Search Report dated Mar. 31, 2015; International Patent Application No. PCT/CN2014/088513 filed on Oct. 13, 2014.

(Continued)

*Primary Examiner* — Backhean Tiv
*Assistant Examiner* — Jihad K Boustany
(74) *Attorney, Agent, or Firm* — McDonald Hopkins LLC (57) ABSTRACT

Disclosed are a method and a device for establishing a multi-domain and dual-home path, herein the method includes: a client network sending information of a first dual-home path and a computation request of a dual-home separating path of the first dual-home path to a parent PCE of a serving network with which the client network is associated; the client network receiving information of the dual-home separating path responded by the parent PCE, herein the information of the dual-home separating path is computed by the parent PCE at least according to the information of the first dual-home path; and the client (Continued)

network establishing a second dual-home path according to the information of the dual-home separating path.

7 Claims, 5 Drawing Sheets

(51) Int. Cl.

| | | |
|---|---|---|
| *H04L 12/735* | (2013.01) | |
| *H04L 12/751* | (2013.01) | |
| *H04L 12/723* | (2013.01) | |
| *H04L 29/08* | (2006.01) | |
| *H04L 45/24* | (2022.01) | |
| *H04L 45/00* | (2022.01) | |
| *H04L 45/128* | (2022.01) | |
| *H04L 45/02* | (2022.01) | |
| *H04L 45/50* | (2022.01) | |
| *H04L 67/63* | (2022.01) | |

(52) U.S. Cl.
CPC ............... *H04L 45/22* (2013.01); *H04L 45/50* (2013.01); *H04L 67/327* (2013.01)

(56) References Cited

U.S. PATENT DOCUMENTS

| | | | | |
|---|---|---|---|---|
| 2013/0286822 | A1* | 10/2013 | Liu | ............ H04L 45/22 370/228 |
| 2014/0156751 | A1* | 6/2014 | Bardalai | ............ H04L 45/50 709/204 |
| 2015/0163125 | A1* | 6/2015 | Caviglia | ............ H04L 45/26 370/254 |

FOREIGN PATENT DOCUMENTS

| | | |
|---|---|---|
| CN | 102195869 A | 9/2011 |
| CN | 101714940 B | 10/2012 |
| CN | 102868607 A | 1/2013 |
| CN | 103188150 A | 7/2013 |
| CN | 103379032 A | 10/2013 |
| CN | 103532615 A | 1/2014 |
| CN | 103532615 A | 1/2014 |
| EP | 1956750 A1 | 8/2008 |
| WO | 2014009105 A1 | 1/2014 |

OTHER PUBLICATIONS

Extended European Search Report dated Jul. 17, 2017; European Patent Application No. 14895682.4.

* cited by examiner

METHOD AND DEVICE FOR ESTABLISHING MULTI-DOMAIN DUAL-HOME PATH

TECHNICAL FIELD

The present disclosure relates to the field of communication, in particular to a method and a device for establishing a multi-domain and dual-home path.

BACKGROUND

In a Multi-Protocol Label Switching (MPLS) and Automatically Switched Optical Network (ASON)/Generalized Multi-Protocol Label Switching (GMPLS) network, a client network (e.g., a router IP network) and a serving network (e.g., an optical transmission network) may be networked in an overlay mode. The client network may initiate operations such as establishment, deletion and modification of a Label Switching Path (LSP) service to the serving network by adopting a Signaling Connection (SC) mode. However, for the conventional Soft Permanent Connection (SPC) mode through a network manager, transmission services can only be separately established by the network manager for serving networks. The flexibility of such mode has already been incapable of satisfying the gradually increasing and rapidly changing transmission service establishment demands of the client networks. For client networks which mainly provide Ethernet network services, it has already been increasingly popular to initiate LSP service establishment to the serving networks by adopting the SC mode, and flexible service scheduling abilities of various granularities can be supported.

Figure 1:
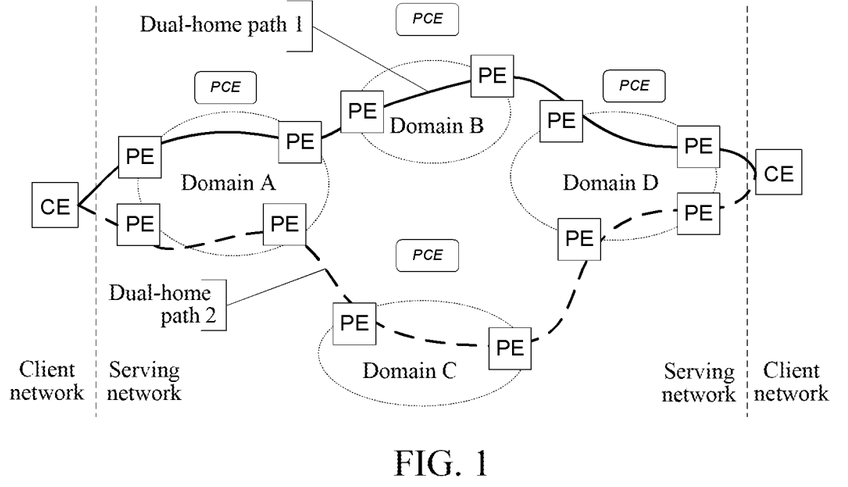
FIG. 1 illustrates a flowchart of establishment of a multi-domain and dual-home path according to the existing technology.

For the conventional SPC service, generally two separated paths, e.g., working+protection paths are established according to the demand of the service grade, such that when a working path is faulted, the transmission service can be rapidly switched to a protection path. Such mode is generally same-source and same-destination, i.e., source nodes of the working and protection paths are same and destination nodes are also same. Moreover, the transmission service switching of such mode is completed by the serving network. Herein, working routing and protection routing need guarantee that the nodes are separated (i.e., nodes in the two paths are not overlapped), links are separated (i.e., links in the two paths are not overlapped) and Shared Risk Link Groups (SRLGs) are separated (i.e., there is no intersection between SRLG IDs of the links in the two paths). In a GMPLS network, when the client network and the serving network are networked according to the overlay mode, the establishment of the dual-home service may be initiated by the client network, i.e., firstly client network Client Edge (CE) requests Provider Edge (PE) to initiate the establishment of an LSP service, the service path is called as a dual-home path 1, then the client network CE requests a PE' node to initiate the establishment of the other LSP service dual-home path 2, that path and the dual-home path 1 are required to realize dual-home separating, i.e., except the initiator equipment source CE of the client network and the receiver equipment destination CE of the client network, other nodes, links and SRLGs of the serving network all need to be separated, and the switching of the dual-home service is controlled by the client network. As illustrated in FIG. 1, it illustrates a schematic diagram of a scenario of a dual-home path under a general situation.

Figure 2:
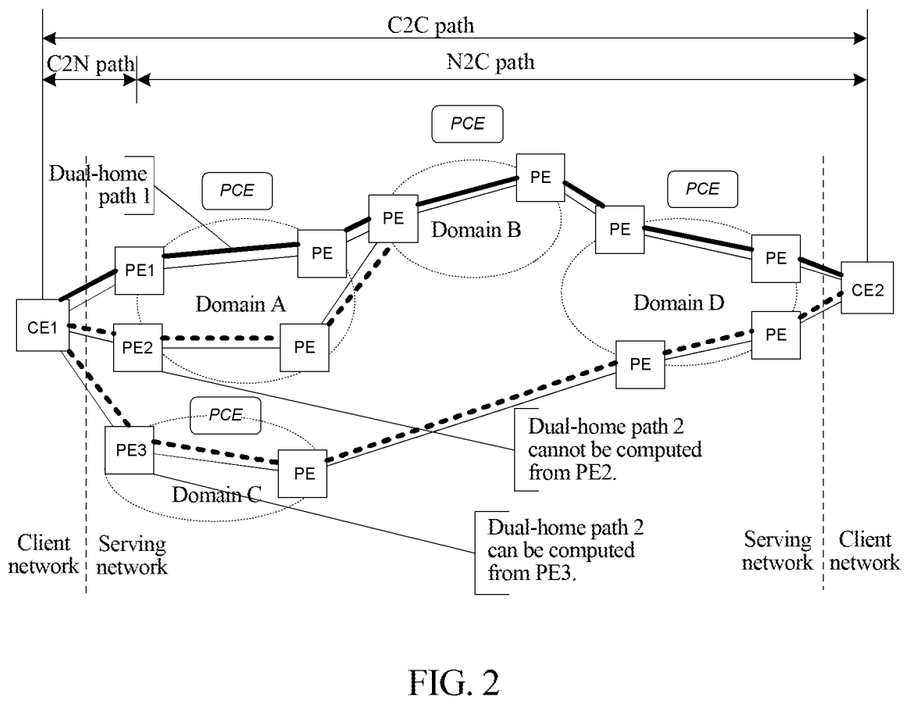
FIG. 2 illustrates a defective schematic diagram of computation of a multi-domain and dual-home path according to the existing technology.

At present, there are a few of solutions for the establishment of multi-domain and dual-home services and there are only some personal proposals such as draft-zhang-ccamp-route-exclusion-pathkey-01. The draft only solves the problem of acquiring the dual-home path 1 by adopting the pathkey. As found by the inventor during research, there are still some problems in the existing technology, which mainly include the following two problems:

1. As illustrated in FIG. 2, in the existing technical solution, Client to Client (C2C) path computation is not directly initiated, but a CE node designates a PE node, then the PE initiates path computation, the PE computes a Network to Client (N2C) path and the path is jointed with a Client to Network (C2N) link of the CE to obtain the C2C path. Herein, the N2C path needs to be saved in a Path Computation Element (PCE) of a domain in which the PE is located. By adopting such method, when a source PE' of the dual-home path selected by the source CE node and the source PE node of the dual-home path 1 are not in the same domain (e.g., two dual-home paths in the serving network need to be fully separated in domain) and when the dual-home path 2 is computed, the PCE of the domain in which the source PE is located needs to be queried firstly to obtain the dual-home path 1 to perform separating computation, collaboration of multiple PCEs needs to be involved and the query process is relatively difficult.

2. In the existing technical solution, since the client network cannot is invisible to the serving network topology, when the dual-home service is established, there is a lack of enough bases to designate the PE source node of the dual-home path 2. In a scenario that the dual-home path 2 cannot be computed (path separating cannot be realized) because the designated PE source node of the dual-home path 2 is not suitable, the establishment of the dual-home service is caused to fail. As illustrated in FIG. 2, when CE1 selects PE2 to establish the dual-home path to CE2, the establishment does not succeed because the dual-home path 2 and the dual-home path 1 cannot realize nodes separating in domain B and domain D. However, from the topology, it can be seen that, if CE1 selects PE3, the dual-home path 2 can be successfully established to realize nodes and links separating. However, due to the needs of topology confidentiality and isolation, at present the client network cannot see any serving network topology, thereby the client network cannot make a correct choice.

So far, there have been no methods for solving the problem that the establishment of the separating path fails for a reason that the PE source node is incorrectly designated because the client network cannot see the serving network topology in the existing technology.

SUMMARY

Embodiments of the present disclosure provide a method and a device for establishing a multi-domain and dual-home path to at least solve the above-mentioned problem.

According to one aspect of an embodiment of the present disclosure, a method for establishing a multi-domain and dual-home path is provided, and the method includes: a client network sending information of a first dual-home path and a computation request of a dual-home separating path of the first dual-home path to a parent Path Computation Element PCE of a serving network with which the client network is associated; the client network receiving information of the dual-home separating path responded by the parent PCE, herein the information of the dual-home separating path is computed by the parent PCE at least according to the information of the first dual-home path; and the client network establishing a second dual-home path according to the information of the dual-home separating path.

Alternatively, after the client network sending the information of the first dual-home path and the computation request of the dual-home separating path of the first dual-home path to the parent PCE of the serving network with which the client network is associated, the method further includes: the parent PCE receiving the computation request and the information of the first dual-home path; the parent PCE responding to the computation request, and computing the information of the dual-home separating path according to the information of the first dual-home path; and the parent PCE sending the information of the dual-home separating path to a requester of the computation request.

Alternatively, the parent PCE responding to the computation request, computing the information of the dual-home separating path according to the information of the first dual-home path includes: the parent PCE performing nodes, links and Shared Risk Link Groups SRLGs separation processing by taking the information of the first dual-home path as a separating condition, and obtaining the information of the dual-home separating path.

Alternatively, the parent PCE responding to the computation request, computing the information of the dual-home separating path according to the information of the first dual-home path includes: the parent PCE querying a plaintext inter-domain path of the first dual-home path according to the information of the first dual-home path and extracting a domain sequence according to the plaintext inter-domain path; the parent PCE computing a boundary node sequence of domains through which the dual-home separating path passes according to an inter-domain topology of the serving network, an end-to-end topology consisting of head and tail Client Edges CEs of the first dual-home path and the domain sequence taken as a separating condition; the parent PCE respectively sending a path computation request to each of child PCEs of the parent PCE according to the boundary node sequence; the parent PCE performing jointing according to received path computation responses made by each of the child PCEs to obtain the information of the dual-home separating path; and the parent PCE sending the information of the dual-home separating path to the requester of the computation request of the dual-home separating path.

Alternatively, each of the child PCEs makes a response to the path computation request according to the following policy: under a situation that the dual-home separating path and the first dual-home path are overlapped in a domain governed by a current child PCE, the current child PCE performing avoidance processing on the dual-home separating path according to the information of the first dual-home path; and the current child PCE sending a path computation response obtained after the avoidance processing performing on the parent PCE.

Alternatively, before the client network sending the information of the first dual-home path and the computation request of the dual-home separating path of the first dual-home path to the parent PCE of the serving network with which the client network is associated, the method further includes: the client network sending a computation request of the first dual-home path to the parent PCE; the client network receiving the information of the first dual-home path responded by the parent PCE; and the client network establishing the first dual-home path according to the information of the first dual-home path.

Alternatively, before the client network receiving the information of the first dual-home path responded by the parent PCE, the method further includes: the parent PCE receiving the computation request of the first dual-home path; the parent PCE responding to the computation request of the first dual-home path, computing a boundary node sequence of domains through which the first dual-home path passes according to an inter-domain topology of the serving network; the parent PCE respectively sending a path computation request to each of child PCEs of the parent PCE according to the boundary node sequence; the parent PCE respectively receiving path computation responses made by each of the child PCEs; the parent PCE performing jointing according to the received path computation responses made by each of the child PCEs to obtain the information of the first dual-home path; and the parent PCE sending the information of the first dual-home path to the requester of the computation request of the first dual-home path.

According to another aspect of an embodiment of the present disclosure, a method for establishing a multi-domain and dual-home path is further provided, and the method includes: a parent Path Computation Element PCE in a serving network receiving information of a first dual-home path and a computation request of a dual-home separating path of the first dual-home path; the parent PCE responding to the computation request, and computing information of the dual-home separating path according to the information of the first dual-home path; and the parent PCE sending the information of the dual-home separating path to a requester of the computation request, herein the information of the dual-home separating path is used by the requester to establish a second dual-home path.

According to another aspect of an embodiment of the present disclosure, a device for establishing a multi-domain and dual-home path is further provided, herein the device is located in a client network and includes: a sending module arranged to send information of a first dual-home path and a computation request of a dual-home separating path of the first dual-home path to a parent PCE of a serving network; a receiving module arranged to receive information of the dual-home separating path responded by the parent PCE, herein the information of the dual-home separating path is computed by the parent PCE at least according to the information of the first dual-home path; and an establishment module arranged to establish a second dual-home path according to the information of the dual-home separating path.

According to another aspect of an embodiment of the present disclosure, a device for establishing a multi-domain and dual-home path is further provided, herein the device is located in a parent PCE of a serving network and includes: a receiving module arranged to receive information of a first dual-home path and a computation request of a dual-home separating path of the first dual-home path; a computation module arranged to respond to the computation request, and compute information of the dual-home separating path according to the information of the first dual-home path; and a sending module arranged to send the information of the dual-home separating path to a requester of the computation request, herein the information of the dual-home separating path is used by the requester to establish a second dual-home path.

Through the embodiments of the present disclosure, by adopting the method that a client network sends information of a first dual-home path and a computation request of a dual-home separating path of the first dual-home path to a parent PCE of a serving network; the client network receives information of the dual-home separating path responded by the parent PCE, herein the information of the dual-home separating path is computed by the parent PCE at least according to the information of the first dual-home path; and the client network establishes a second dual-home path according to the information of the dual-home separating path, the problem that the establishment of the separating path fails for a reason that a PE source node is incorrectly designated because the client network cannot see the serving network topology is solved, and thereby the success rate of the establishment of the separating path is improved.

BRIEF DESCRIPTION OF DRAWINGS

The drawings described here are used for providing further understanding about the present disclosure and constitute a part of the present application. The exemplary embodiments of the present disclosure and the description thereof are used for explaining the present disclosure instead of improperly limiting the present disclosure. In the drawings.

SPECIFIC EMBODIMENTS

It needs to be stated that the embodiments in the present application and the features in the embodiments may be mutually combined under the situation of no conflict. The present disclosure will be described below in detail with reference to the drawings in combination with the embodiments.

The steps illustrated in the flowcharts of the drawings may be executed in a computer system such as containing a group of computer-executable instructions. In addition, although logic sequences are illustrated in the flowcharts, the illustrated or described steps may be executed according to sequences different from the sequences here under certain circumstances.

In order to solve the problem that the establishment of separating path fails for a reason that a PE source node is incorrectly designated because a client network cannot see a serving network topology, the embodiment provides a method for establishing a multi-domain and dual-home path. The method not only can solve the problem of the establishment of the dual-home path, but also can be used for implementing the establishment of the other pair of separating paths.

Figure 3:
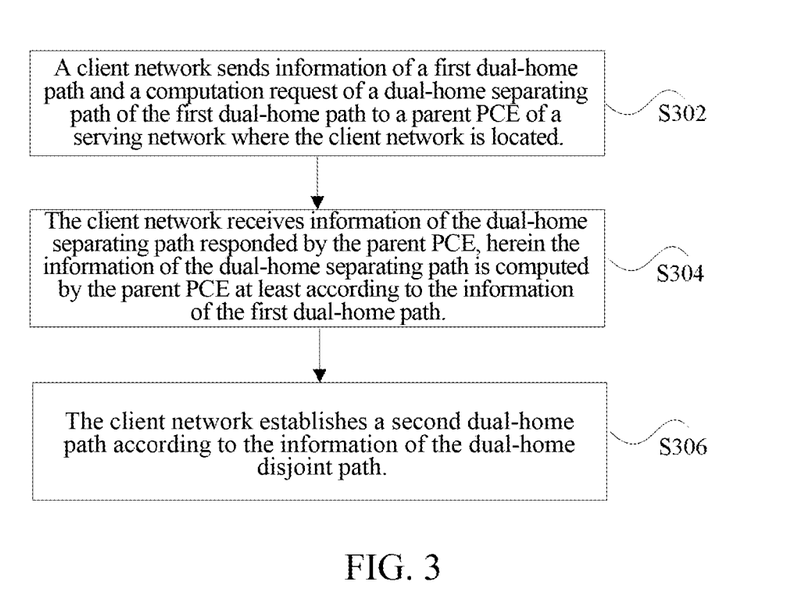
FIG. 3 illustrates a flowchart of a method for establishing a multi-domain and dual-home path according to the embodiment of the present disclosure.

FIG. 3 illustrates a flowchart of a method for establishing a multi-domain and dual-home path according to the embodiment of the present disclosure. As illustrated in FIG. 3, the process includes the following steps.

In step S302, a client network sends information of a first dual-home path and a computation request of a dual-home separating path of the first dual-home path to a parent PCE of a serving network with which the client network is associated.

In step S304, the client network receives information of the dual-home separating path responded by the parent PCE, herein the information of the dual-home separating path is computed by the parent PCE at least according to the information of the first dual-home path.

In step S306, the client network establishes a second dual-home path according to the information of the dual-home separating path.

Through the above-mentioned steps, by adopting the method that the client network directly establishes the dual-home separating path of the first dual-home path through the parent PCE of the serving network with which the client network is associated, the situation that the establishment of the separating path fails for a reason that the client network directly selects a PE source node to establish the dual-home separating path can be avoided, thereby the problem that the establishment of the separating path fails for a reason that the PE source node is incorrectly designated because the client network cannot see the serving network topology is solved, and the success rate of the establishment of the separating path is improved. Besides, by directly requesting the parent PCE for the establishment of the dual-home path of the first dual-home path, the C2C dual-home separating path can be directly established and thereby the establishing efficiency of the dual-home separating path is improved.

Besides, it needs to be stated that the above-mentioned embodiment is not limited to the implementation of the establishment of the dual-home separating path of the dual-home path and may also be used for other situations of establishing another separating path on the premise that there has been a path. In the embodiment of the present disclosure, introduction is made by taking the establishment of the dual-home separating path as an example.

Alternatively, in step S302, the client network sends the information of the first dual-home path and the computation request of the dual-home separating path to the parent PCE of the serving network with which the client network is associated through child PCEs corresponding to a domain in which the child PCEs are located.

Alternatively, after step S302, the operation that the parent PCE performs processing according to the received information and request and performs computation to obtain the information of the dual-home separating path includes the following operations. The parent PCE receives the computation request and the information of the first dual-home path; the parent PCE responds to the computation request, computes the information of the dual-home separating path according to the information of the first dual-home path; and the parent PCE sends the information of the dual-home separating path to a requester of the computation request.

Alternatively, in the above-mentioned embodiment, in the process that the parent PCE computers the information of the dual-home separating path, the parent PCE performs nodes, links and SRLGs separating processing by taking the information of the first dual-home path as a separating condition to obtain the information of the dual-home separating path.

Alternatively, the nodes, links and SRLGs separating processing performed by the parent PCE is implemented by adopting a method of interacting with each of child PCEs. For example, the parent PCE queries a plaintext inter-domain path of the first dual-home path according to the information of the first dual-home path and extracts a domain sequence according to the plaintext inter-domain path; the parent PCE computes a boundary node sequence of domains through which the dual-home separating path passes according to an inter-domain topology of the serving network, an end-to-end topology consisting of head and tail CEs of the first dual-home path and the domain sequence taken as a separating condition; the parent PCE respectively sends a path computation request to each of child PCEs of the parent PCE according to the boundary node sequence; the parent PCE performs jointing according to received path computation responses made by each of the child PCEs to obtain the information of the dual-home separating path; and the parent PCE sends the information of the dual-home separating path to the requester of the computation request of the dual-home separating path. Herein, the child PCEs make responses to the path computation request by adopting the similar method in the existing technology, which is not repetitively described in the embodiment of the present disclosure.

Alternatively, each of the child PCEs makes a response to the path computation request according to the following policy: under a situation that the dual-home separating path and the first dual-home path are overlapped in a domain governed by a current child PCE, the current child PCE performs avoidance processing on the dual-home separating path according to the information of the first dual-home path; and the current child PCE sends a path computation response obtained after the avoidance processing performed on the parent PCE. In other words, under the situation that the dual-home separating path and the first dual-home path pass through the same domain (or in other words, there is an overlapped domain in the domain sequence through which the dual-home separating path passes and the domain sequence through which the first dual-home path passes), the child PCEs of the same domain perform avoidance processing on the dual-home separating path and the first dual-home path in this same domain to satisfy nodes, links and SRLGs separating requirements.

The first dual-home path may be established by adopting any method for establishing an original path in the existing technology. For example, the client network establishes the first dual-home path through a PE source node. Alternatively, in the embodiment of the present disclosure, the first dual-home path is established by adopting a method through the parent PCE. For example, the client network sends a computation request of the first dual-home path to the parent PCE; the client network receives information of the first dual-home path responded by the parent PCE; and the client network establishes the first dual-home path according to the information of the first dual-home path.

Alternatively, the parent PCE establishes the first dual-home path through interaction with the child PCEs. For example, the parent PCE receives the computation request of the first dual-home path; the parent PCE computes a boundary node sequence of domains through which the first dual-home path passes according to an inter-domain topology of the serving network in response to the computation request of the first dual-home path; the parent PCE respectively sends a path computation request to each of child PCEs of the parent PCE according to the boundary node sequence; the parent PCE respectively receives path computation responses made by each of the child PCEs; the parent PCE performs jointing according to the received path computation responses made by each of the child PCEs to obtain the information of the first dual-home path; and the parent PCE sends the information of the first dual-home path to the requester of the computation request of the first dual-home path. Herein, the child PCEs make responses to the path computation request by adopting the similar method in the related art, which is not repetitively described in the embodiment of the present disclosure.

Figure 4:
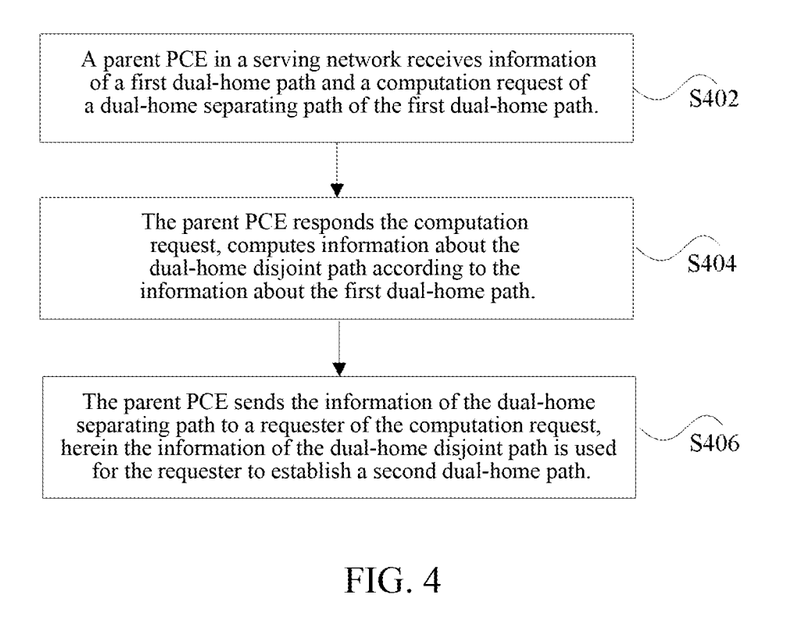
FIG. 4 illustrates a flowchart of another method for establishing a multi-domain and dual-home path according to the embodiment of the present disclosure.

An embodiment further provides a method for establishing a multi-domain and dual-home path. The method is applied in a parent PCE. FIG. 4 illustrates a flowchart of another method for establishing a multi-domain and dual-home path according to the embodiment of the present disclosure. As illustrated in FIG. 4, the process includes the following steps.

In step S402, a parent PCE in a serving network receives information of a first dual-home path and a computation request of a dual-home separating path of the first dual-home path.

In step S404, the parent PCE computes information of the dual-home separating path according to the information of the first dual-home path in response to the computation request.

In step S406, the parent PCE sends the information of the dual-home separating path to a requester of the computation request, herein the information of the dual-home separating path is used by the requester to establish a second dual-home path.

Herein, the requester of the computation request is a client network, and the client network initiates a computation request to the parent PCE and transmits the information of the first dual-home path through corresponding child PCEs.

Alternatively, step S404 includes the following operation: the parent PCE performs nodes, links and SRLGs separating processing by taking the information of the first dual-home path as a separating condition to obtain the information of the dual-home separating path.

Alternatively, step S404 includes the following operations: the parent PCE queries a plaintext inter-domain path of the first dual-home path according to the information of the first dual-home path and extracts a domain sequence according to the plaintext inter-domain path; the parent PCE computes a boundary node sequence of domains through which the dual-home separating path passes according to an inter-domain topology of the serving network, an end-to-end topology consisting of head and tail CEs of the first dual-home path and the domain sequence taken as a separating condition; the parent PCE respectively sends a path computation request to each of child PCEs of the parent PCE according to the boundary node sequence; the parent PCE performs jointing according to received path computation responses made by each of the child PCEs to obtain the information of the dual-home separating path; and the parent PCE sends the information of the dual-home separating path to the requester of the computation request of the dual-home separating path.

Alternatively, each of the child PCEs makes a response to the path computation request according to the following policy: under a situation that the dual-home separating path and the first dual-home path are overlapped in a domain governed by a current child PCE, the current child PCE performs avoidance processing on the dual-home separating path according to the information of the first dual-home path; and the current child PCE sends a path computation response obtained after the avoidance processing performing on the parent PCE.

Alternatively, before step S402, the method further includes the following operations: the client network requests the parent PCE to compute the information of the first dual-home path, e.g., the client network sends a computation request of the first dual-home path to the parent PCE; the client network receives the information of the first dual-home path responded by the parent PCE; and the client network establishes the first dual-home path according to the information of the first dual-home path.

Alternatively, the operation that the parent PCE computes the information of the first dual-home path includes the following operations. The parent PCE receives the computation request of the first dual-home path; the parent PCE computes a boundary node sequence of domains through which the first dual-home path passes according to an inter-domain topology of the serving network in response to the computation request of the first dual-home path; the parent PCE respectively sends a path computation request to each of child PCEs of the parent PCE according to the boundary node sequence; the parent PCE respectively receives path computation responses made by each of the child PCEs; the parent PCE performs jointing according to the received path computation responses made by each of the child PCEs to obtain the information of the first dual-home path; and the parent PCE sends the information of the first dual-home path to the requester of the computation request of the first dual-home path.

Figure 5:
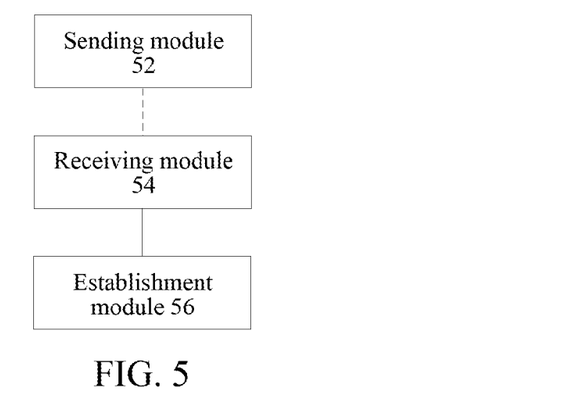
FIG. 5 illustrates a structural schematic diagram of a device for establishing a multi-domain and dual-home path according to the embodiment of the present disclosure.

In order to implement the method for establishing the multi-domain and dual-home path, an embodiment further provides a device for establishing a multi-domain and dual-home path, located in a client network. FIG. 5 illustrates a structural schematic diagram of a device for establishing a multi-domain and dual-home path according to the embodiment of the present disclosure. As illustrated in FIG. 5, the device includes: a sending module 52, a receiving module 54 and an establishment module 56, herein the sending module 52 is coupled to a parent PCE and is arranged to send information of a first dual-home path and a computation request of a dual-home separating path of the first dual-home path to a parent PCE of a serving network; the receiving module 54 is coupled to the parent PCE and is arranged to receive information of the dual-home separating path responded by the parent PCE, herein the information of the dual-home separating path is computed by the parent PCE at least according to the information of the first dual-home path; and the establishment module 56 is coupled to the receiving module 54 and is arranged to establish a second dual-home path according to the information of the dual-home separating path.

The modules and elements involved in the embodiment of the present disclosure may be implemented by means of software and may also be implemented by means of hardware. The modules and elements described in the embodiment may also be arranged in a processor. For example, it may be described as: a processor including a sending module 52, a receiving module 54 and an establishment module 56. Herein, names of these modules do not constitute limitations to the modules themselves under certain circumstances. For example, the sending module 52 may also be described as "a module arranged to send information of a first dual-home path and a computation request of a dual-home separating path of the first dual-home path to a parent PCE of a serving network".

Figure 6:
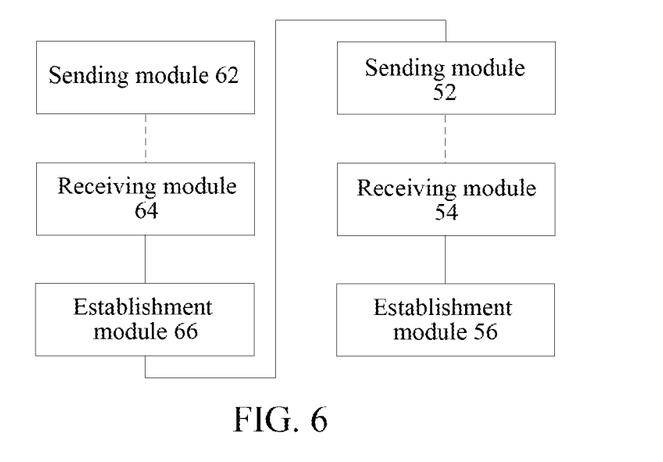
FIG. 6 illustrates an alternative structural schematic diagram of a device for establishing a multi-domain and dual-home path according to the embodiment of the present disclosure.

FIG. 6 illustrates an alternative structural schematic diagram of a device for establishing a multi-domain and dual-home path according to the embodiment of the present disclosure. As illustrated in FIG. 6, alternatively, the device may further include: a sending module 62 coupled to the parent PCE and arranged to send a computation request of the first dual-home path to the parent PCE; a receiving module 64 coupled to the parent PCE and arranged to receive the information of the first dual-home path responded by the parent PCE; and an establishment module 66 coupled to the receiving module 64, coupled to the sending module 52 and arranged to establish the first dual-home path according to the information of the first dual-home path.

Figure 7:
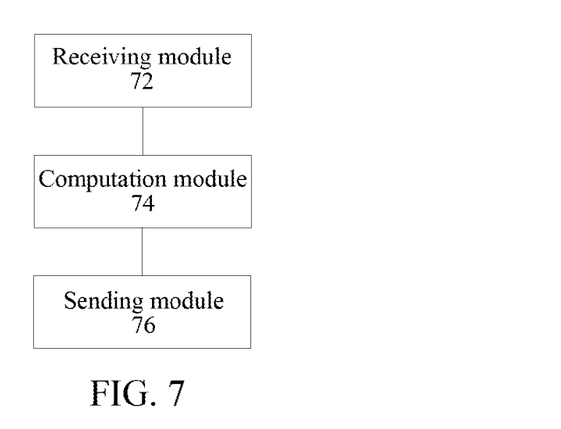
FIG. 7 illustrates a structural schematic diagram of another device for establishing a multi-domain and dual-home path according to the embodiment of the present disclosure.

In order to implement the method for establishing the multi-domain and dual-home path, an embodiment further provides a device for establishing a multi-domain and dual-home path, located in a parent PCE of a serving network. FIG. 7 illustrates a structural schematic diagram of another device for establishing a multi-domain and dual-home path according to the embodiment of the present disclosure. As illustrated in FIG. 7, the device includes: a receiving module 72, a computation module 74 and a sending module 76, herein the receiving module 72 is coupled to a client network and is arranged to receive information of a first dual-home path and a computation request of a dual-home separating path of the first dual-home path; the computation module 74 is coupled to the receiving module 72 and is arranged to compute information of the dual-home separating path according to the information of the first dual-home path in response to the computation request; and the sending module 76 is coupled to the computation module 74 and is arranged to send the information of the dual-home separating path to a requester of the computation request, herein the information of the dual-home separating path is used by the requester to establish a second dual-home path.

Alternatively, the computation module 74 is further arranged to perform nodes, links and SRLGs separating processing by taking the information of the first dual-home path as a separating condition to obtain the information of the dual-home separating path.

Alternatively, the computation module 74 further includes: a query element 7402 arranged to query a plaintext inter-domain path of the first dual-home path according to the information of the first dual-home path and extract a domain sequence according to the plaintext inter-domain path; a computation element 7404 coupled to the query element 7402 and arranged to compute a boundary node sequence of domains through which the dual-home separating path passes according to an inter-domain topology of the serving network, an end-to-end topology consisting of head and tail CEs of the first dual-home path and the domain sequence used as a separating condition; a sending element 7406 coupled to the computation element 7404 and each of child PCEs and arranged to respectively send a path computation request to each of the child PCEs of the parent PCE according to the boundary node sequence; a jointing element

7408 coupled to each of the child PCEs and arranged to perform jointing according to received path computation responses made by each of the child PCEs to obtain the information of the dual-home separating path; and a sending element 7410 coupled to the jointing element 7408 and arranged to send the information of the dual-home separating path to the requester of the computation request of the dual-home separating path.

Alternatively, the device further includes: a receiving module 802 coupled to the client network and arranged to receive the computation request of the first dual-home path; a computation module 804 coupled to the receiving module 802 and arranged to compute a boundary node sequence of domains through which the first dual-home path passes according to an inter-domain topology of the serving network in response to the computation request of the first dual-home path; a sending module 806 coupled to the computation module 804 and each of the child PCEs and arranged to respectively send a path computation request to each of the child PCEs of the parent PCE according to the boundary node sequence; a receiving module 808 coupled to each of the child PCEs and arranged to respectively receive path computation responses made by each of the child PCEs; a jointing module 810 coupled to the receiving module 808 and arranged to perform jointing according to the received path computation responses made by each of the child PCEs to obtain the information of the first dual-home path; and the sending module 812 coupled to the jointing module 810 and arranged to send the information of the first dual-home path to the requester of the computation request of the first dual-home path.

The present disclosure will be described below in combination with the alternative embodiments of the present disclosure.

The technical problem to be solved by the alternative embodiments of the present disclosure is to provide a method for establishing a dual-home path based on grade PCEs. In the method, a CE of a client network directly initiates a path computation request of a dual-home path 1 to a parent PCE of a serving network, after an encrypted multi-domain path is obtained, the multi-domain path is sent to a source CE node of the client network, and the source CE node initiates establishment of the dual-home path 1 according to routing hops. Then, the source CE node of the client network initiates establishment of a dual-home path 2 to the parent PCE of the serving network, the dual-home path 1 is used as a dual-home separating path which is carried to the parent PCE, and the parent PCE performs node, link and SRLG separating processing by taking the dual-home path 1 as a separating condition based on an extended inter-domain topology containing CE nodes and links. Through the method, the CE of the client network can directly compute an end-to-end dual-home service path by virtue of the parent PCE of the serving network.

Firstly the following definitions are made for the sake of convenience in a description process:

CE(1) and CE(N) respectively represent source client edge equipment and destination client edge equipment.

Domain(1), Domain(2), Domain(i) and Domain(N) respectively represent a head domain 1, a head domain 2, a middle domain i and a tail domain N in a serving network.

PCE(H) represents a high-layer PCE or a parent PCE in a serving network.

PCE(L,X) represents a PCE(X) of a low-layer domain in a serving network (X=1, 2, i, N), herein the PCE of the low-layer domain may also be called as a child PCE.

P1 and P2 respectively represent a dual-home path 1 and a dual-home path 2.

PE(P,X,1) represents first provider edge equipment of a dual-home path P in Domain(X), herein X=1, 2, i, N; and P=P1, P2.

PE(P, X, N) represents last provider edge equipment of a dual-home path P in Domain(X), herein X=1, 2, i, N; and P=P1, P2.

PKS(P, H) represents pathkey of a serving network path of a dual-home path P (P=P1, P2) generated by PCE(H), and is used for guaranteeing that an entire serving network is topologically concealed from a client network.

PKS(P, L, X) represents pathkey of an inter-domain path of a dual-home path P (P=P1, P2) generated by PCE(L, X) (X=1, 2, i, N) in Domain(X) (X=1, 2, i, N), and is used for guaranteeing that an inter-domain topology in Domain(X) is topologically avoided from PCE(H).

Path(P, L, X) represents an inter-domain path of a dual-home path P (P=P1, P2) in Domain(X) (X=1, 2, i, N).

PCReq(P, A, Z) represents a computation request for computing a path P from a source node A to a destination node Z, herein A and Z may be a CE or PE node, P=P1, P2.

PCRep(P, A, Z) represents a computation response for computing a path P from a source node A to a destination node Z, herein A and Z may be a CE or PE node, P=P1, P2.

PCReq(PKS) represents a request for querying an actual route of PKS.

PCRep(PKS) represents a response for querying an actual route of PKS.

Figure 8:
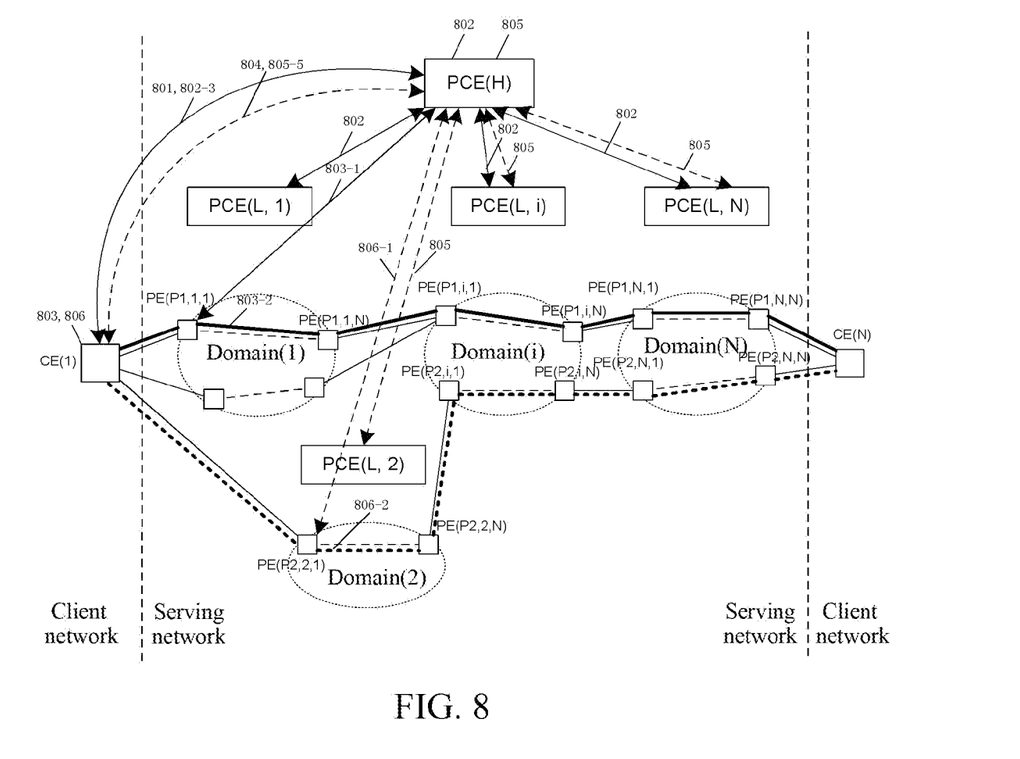
FIG. 8 illustrates a schematic diagram of establishment of a multi-domain and dual-home path according to the alternative embodiment of the present disclosure.

Process steps of the method for establishing the dual-home path based on the grade PCEs provided by the preferred embodiment of the present disclosure are as illustrated in FIG. 8. The steps are as follows.

In step S801, CE(1) sends a request PCReq (P1, CE(1), CE(N)) for computing an end-to-end path P1 from CE(1) to CE(N) to PCE(H).

Figure 9:
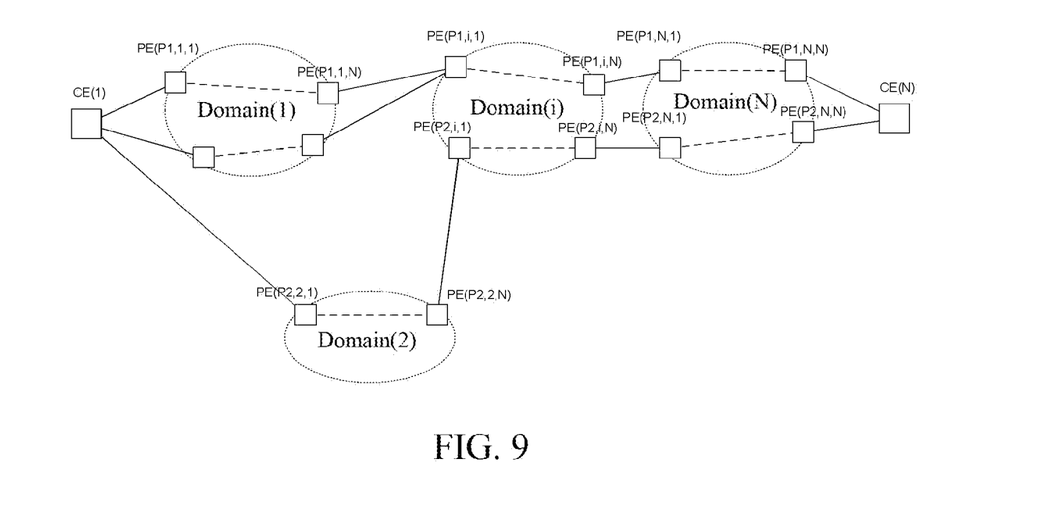
FIG. 9 illustrates a schematic diagram of an inter-domain topology according to the alternative embodiment of the present disclosure.

In step S802-1, a node sequence, i.e., CE(1)-PE(P1, 1, 1)-PE(PE, 1, N)-PE(P1, i, N)-PE(P 1, N, 1)-PE(P1, N, N)-CE(2), of a domain through which P1 passes is computed according to in inter-domain topology (as illustrated in FIG. 9).

In step S802-2, PCE(H) sends path computation requests of each domain, respectively including:

PCReq(PE(P1, 1, 1), PE(P1, 1, N)) sent from PCE(H) to PCE(L, 1);

PCReq(PE(P1, i, 1), PE(P1, i, N)) sent from PCE(H) to PCE(L, i); and

PCReq(PE(P1, N, 1), PE(P1, N, N)) sent from PCE(H) to PCE(L, N).

Then PCE(H) receives path computation responses respectively from each child PCE, respectively including:

PCRep(PE(P1, 1, 1), PE(P1, 1, N)) of PCE(L, 1);

PCRep(PE(P1, i, 1), PE(P1, i, N)) of PCE(L, i); and

PCRep(PE(P1, N, 1), PE(P1, N, N)) of PCE(L, N).

In step S802-3, PCE(H) performs jointing on path computation results of each domain to obtain P1=CE(1)-PE(P1, 1, 1)-PKS(P1, L, 1)-PE(P1, 1, N)-PE(P1, i, 1)-PKS(P1, L1, i)-PE(P1, N)-PE(P1, N, 1)-PKS(P1, L. N)-PE(P1, N, N)-CE (N). PCE(H) generates pathkey which is PKS(P1, H) through other serving network paths except that of PE(P1, 1, 1) and PE(P1, N, N). The end-to-end path is expressed as P1=CE(1)-PE(P1, 1, 1)-PKS(P1, H)-PE(P1, N, N)-CE(2), which is sent to CE(1) by sending PCRep(CE(1), CE(N)).

In step S803, after the node CE(1) obtains the path P1, the node CE(1) starts initiating establishment of signaling. A process, for example, includes the following steps.

In step S803-1, signaling reaches the node PE(P1, 1, 1) along the path P1, the node PE (P1, 1, 1) sends PCReq(PKS (P1, H)) for querying a serving network path of PKS(P1, H) to PCE(H), and PCE(H) returns the serving network path PE(P1,1,1)-PKS(P1,L,1)-PE(P1,1,N)-PE(P1,i,1)-PKS (P1, L,i)-PE(P1,i,N)-PE(P1,N,1)-PKS (P1,L,N)-PE(P1,N,N) to PE(P1, 1, 1) through PCRep(PKS (P1, H)).

In step S803-2, the signaling sends PCReq(PKS(P1, L, X)) for querying an inter-domain path Path(P1, L, X) of P1 in Domain (X) from PE(P1, X, 1) (herein X=1, i, N) to PCE(L, X), PCE(L, X) returns the path, the signaling is continuously established along the route and finally reaches CE(N) and thereby the establishment of the path P1 is completed.

In step S804, CE(1) sends a request PCReq(P2, CE(1), CE(N)) for computing an end-to-end path P2 from CE(1) to CE(N) to PCE(H), herein the request carries the path P1.

Step S805, PCE(H) computes the path P2. A process, for example, includes the following steps.

In step S805-1, PCE(H) performs query according to PKS(P1,H) in the path P1 to obtain that a plaintext inter-domain path of P1 is PE(P1,1,1)-PKS (P1,L,1)-PE(P1,1,N)-PE(P1,i,1)-PKS(P 1,L,i)-PE(P1,i,N)-PE(P1,N,1)-PKS(P1,L,N)-PE(P1,N,N). A domain sequence is extracted therefrom and is PE(P1,1,1)-PE(P1,1,N)-PE(P1,1)-PE(P1,i,N)-PE(P1, N,1)-PE(P 1,N,N), and the domain sequence is used as a separating constraint.

In step S805-2, a node sequence, i.e., CE(1)-PE(P2,1,1)-PE(P2,1,N)-PE(P2,i,1)-PE(P 2,i,N)-PE(P2,N,1)-PE(P2,N, N)-CE(N), of a domain through which P2 passes is computed according to an inter-domain topology of the serving network and an end-to-end topology consisting of CE(1) and CE(N) by taking the domain sequence in step S805-1 as a separating condition.

In step S805-3, PCE(H) sends a path computation request of each domain, i.e., PCReq(PE(P2, X, 1), PE(P2, X, N)) sent from PCE(H) to PCE(L, X), herein X=2, i, N.

In step S805-4, 1) if domains through which P2 and P1 pass are overlapped in Domain(X), for the overlapped domain, firstly PCE (L, X) is queried by using PKS(P1, L, X) to obtain Path (P1, L, X), PCE(L, X) performs avoidance processing during computation by using the path as an original path for separating computation, an inter-domain path Path(P2, L, X) of P2 in Domain(X) is computed, and encrypted expression is performed by using PKS(P2, L, X). Finally, the path containing PKS(P2, L, X) is returned to PCE(H) through PCRep(P2, PE(P2, X, 1), PE(P2, X, N), herein X=1, 2, i, N; and 2) if the domains through which P2 and P1 pass are not overlapped in Domain(X), when PCE(L, X) computes the inter-domain path of P2 in Domain(X), the avoidance processing does not need to be performed by using the original path for separating computation, the inter-domain path of P2 in Domain(X) may be directly computed by PCE (L, X) and is expressed by using PKS(P2, L, X). Finally, the path is returned to PCE(H) through PCRep(P2, PE(P2, X, 1), PE(P2, X, N)), herein X=1, 2, i, N.

In step S805-5, PCE(H) performs jointing on path computation results of each domain to obtain P2=CE(1)-PE(P2, 1, 1)-PKS(P2, L, 1)-PE(P2, 1, N)-PE(P2, i, 1)-PKS(P2, L1, i)-PE(P2, N)-PE(P2, N, 1)-PKS(P2, L. N)-PE(P2, N, N)-CE (N). PCE(H) generates pathkey which is PKS(P1, H) through other serving network paths except that of PE(P1, 1, 1) and PE(P2, N, N). The end-to-end path is expressed as P2=CE(1)-PE(P2, 1, 1)-PKS(P2, H)-PE(P2, N, N)-CE(2), which is sent to CE(1) by sending PCRep(CE(1), CE(N)).

In step S806, after the node CE(1) obtains the path P2, the node CE(1) starts initiating establishment of signaling. A process, for example, includes the following steps:

In step S806-1, signaling reaches the node PE(P1, 1, 1) along the path P1, the node PE(P1, 1, 1) sends PCReq(PKS (P1, H)) for querying a serving network path of PKS(P1, H) to PCE(H), and PCE(H) returns the serving network path PE(P1, 1, 1)-PKS(P1, L, 1)-PE(P1, 1, N)-PE(P1, 1)-PKS (P1, L, i)-PE(P1, i, N)-PE(P1, N, 1)-PKS(P1, L, N)-PE(P1, N, N) to PE(P1, 1, 1) through PCRep(PKS(P1, H)).

In step S806-2, the signaling sends PCReq(PKS(P1, L, X)) for querying an inter-domain path Path(P2, L, X) of P2 in Domain (X) from PE(P2, X, 1) (herein X=1, i, N) to PCE(L, X), PCE(L, X) returns the path, the signaling is continuously established along the route and finally reaches CE(N) and thereby the establishment of the path P2 is completed.

In step S807, the establishment of the end-to-end dual-home path P2 succeeds and the process of the method is ended.

Alternatively, in step S801, CE(1) needs to have a capability of connection with PCE(H) of the serving network, and a PCEP session between CE(1) and PCE(H) is normally established.

Alternatively, in step S802, the inter-domain topology which is seen by PCE(H) includes CE(1) and CE(N) and other links connected with the serving network, which need to be manually or automatically configured to PCE(H).

Alternatively, in step S804, separating conditions such as node separating, link separating, SRLG separating and domain separating are further included. The conditions may be flexibly selected according to the needs of the client network.

Alternatively, in step S802-3, P1 may also be expressed as P1=CE(1)-PE(P1, 1, 1)-PKS(P 1, H)-CE(2), i.e., the node PE(P1, N, N) is not exposed to the client network. A policy whether the node PE(P1, N, N) is exposed to the client network may be flexibly determined according to confidentiality requirements of the network.

Alternatively, in step S805-5, P2 may also be expressed as P2=CE(1)-PE(P2, 1, 1)-PKS(P 2, H)-CE(2), i.e., the node PE(P2, N, N) is not exposed to the client network. A policy may be determined according to confidentiality requirements of the network.

Alternatively, PKS(P1, H) and PKS(P2, H) need to be saved in PCE(H) and saving time may be customized. PKS(P, L, X) (P=P1/P2, X=1/2/i/N) need to be saved in PCE(X)(X=1/2/i/N) and saving time may be customized.

In order to more vividly describe several main processing processes involved in the methods and systems provided by the present disclosure, description will be made below through specific embodiments.

Figure 10:
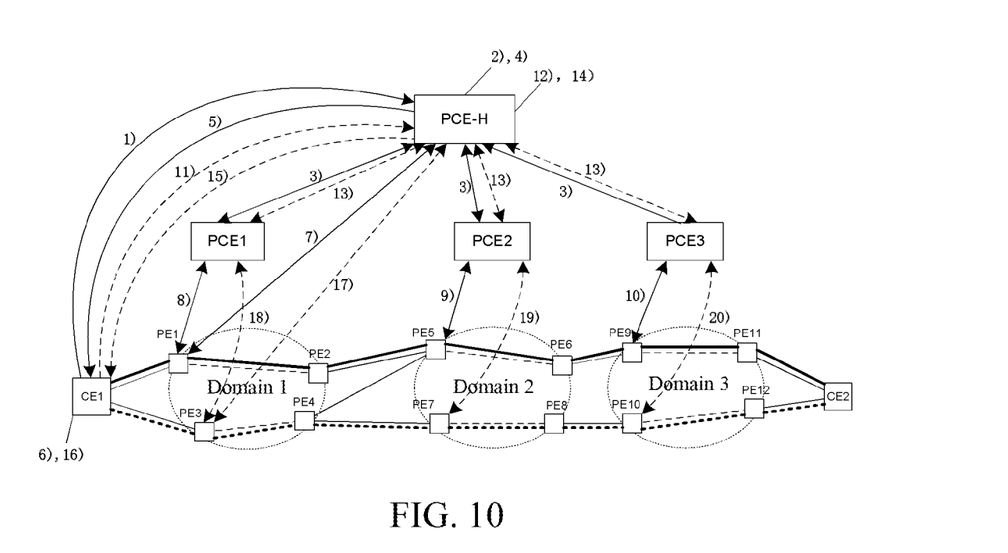
FIG. 10 illustrates a schematic diagram of computing dual-home paths with head domains which are the same domain according to alternative embodiment 1 of the present disclosure.

Embodiment 1: A Dual-Home Path with Head Domains which are the Same Domain is Computed by Adopting the Method Provided by the Embodiment of the Present Disclosure As illustrated in FIG. 10, the following definitions are made:

Domain1, Domain2 and Domain3 are respectively three domains and PCEs thereof are respectively PCE1, PCE2 and PCE3. PCE-H represents high-layer PCE which establishes sessions with each of child PCEs. CE1 and CE2 are respectively client network edge equipment and used for initiating service establishment requests. PE1 . . . PE12 are serving network edge equipment. Specific steps are as follows.

In step 1, CE1 initiates a request PCReq for establishing an end-to-end path P1 from CE1 to CE2 to PCE-H.

In step 2, PCE-H computes a domain sequence from CE1 to CE2 according to an inter-domain topology, obtains the domain sequence which is CE1-PE1-PE2-PE5-PE6-PE9-PE11-CE2.

In step 3, PCE-H respectively sends a path computation request PCReq for decomposing the domain sequence into PE1-PE-2, PE5-PE6 and PE9-PE11 to PCE1, PCE2 and PCE3, obtains paths which are respectively PE1-pathkey1-PE2, PE5-pathkey2-PE6 and PE9-pathkey3-PE11, and the paths are returned to PCE-H.

In step 4, PCE-H joints the paths to obtain an end-to-end path P1=CE1-PE1-pathkey1-PE2-PE5-pathkey2-PE6-PE9-pathkey3-PE11-CE2. A serving network path section PE1-pathkey1-PE2-PE5-pathkey2-PE6-PE9-pathkey3-PE11 is encrypted to be pathkeyH.

In step 5, PCE-H returns the path P1=CE1-PE1-pathkeyH-CE2 to CE1.

In step 6, PCE-H initiates establishment of signaling of P1 according to a route of P1.

In step 7, the signaling reaches PE1, PE1 queries pathkeyH from PCE-H to obtain a serving network pathPE1-pathkey1-PE2-PE5-pathkey2-PE6-PE9-pathkey3-PE11, and the path is returned to PE1.

In step 8, PE1 requests PCE1 to query a plaintext path of pathkey1 and the signaling is routed to a node PE5 according to the obtained path.

In step 9, PE5 requests PCE2 to query a plaintext path of pathkey2 and the signaling is routed to a node PE9 according to the obtained path.

In step 10, PE9 requests PCE3 to query a plaintext path of pathkey3 and the signaling is routed to a node CE2 according to the obtained path, such that the establishment of the signaling of the path P1 is completed.

In step 11, CE1 initiates a request PCReq for establishing an end-to-end path P2 from CE1 to CE2, herein the request carries the path P1=CE1-PE1-pathkeyH-CE2.

In step 12, PCE-H performs query according to pathkeyH in the path P1 to obtain a serving network full path which is P1=CE1-PE1-pathkey1-PE2-PE5-pathkey2-PE6-PE9-pathkey3-PE11-CE2. The domain sequence, i.e., CE1-PE1-PE2-PE5-PE6-PE9-PE11 in P1 is extracted, and a domain sequence of the dual-home path P2 is computed by using the domain sequence in P1 as a separating condition, herein the obtained domain sequence is CE1-PE3-PE4-PE7-PE8-PE10-PE12-CE2.

In step 13, PCE-H respectively sends a path computation request PCReq for decomposing the domain sequence into PE3-PE4, PE7-PE8 and PE10-PE12 to PCE1, PCE2 and PCE3 to obtain paths which are respectively PE3-pathkey1'-PE4, PE7-pathkey2'-PE8 and PE10-pathkey3'-PE12, and the paths are returned to PCE-H.

In step 14, PCE-H joints the paths to obtain an end-to-end path P2=CE1-PE3-pathkey1'-PE4-PE7-pathkey2'-PE8-PE10-pathkey3'-PE12-CE2. A serving network path section PE3-pathkey1'-PE4-PE7-pathkey2'-PE8-PE10-pathkey3'-PE12 is encrypted to be pathkeyH'.

In step 15, PCE-H returns the path P2=CE1-PE3-pathkeyH'-CE2 to CE1.

In step 16, PCE-H initiates establishment of signaling of P2 according to a route of P2.

In step 17, the signaling reaches PE3, PE3 queries pathkeyH' from PCE-H to obtain a serving network path PE3-pathkey1'-PE4-PE7-pathkey2'-PE8-PE10-pathkey3'-PE12, and the path is returned to PE3.

In step 18, PE3 requests PCE1 to query a plaintext path of pathkey1' and the signaling is routed to a node PE7 according to the obtained path.

In step 19, PE7 requests PCE2 to query a plaintext path of pathkey2' and the signaling is routed to a node PE10 according to the obtained path.

In step 20, PE10 requests PCE3 to query a plaintext path of pathkey3' and the signaling is routed to the node CE2 according to the obtained path, such that the establishment of the signaling of the path P2 is completed.

Figure 11:
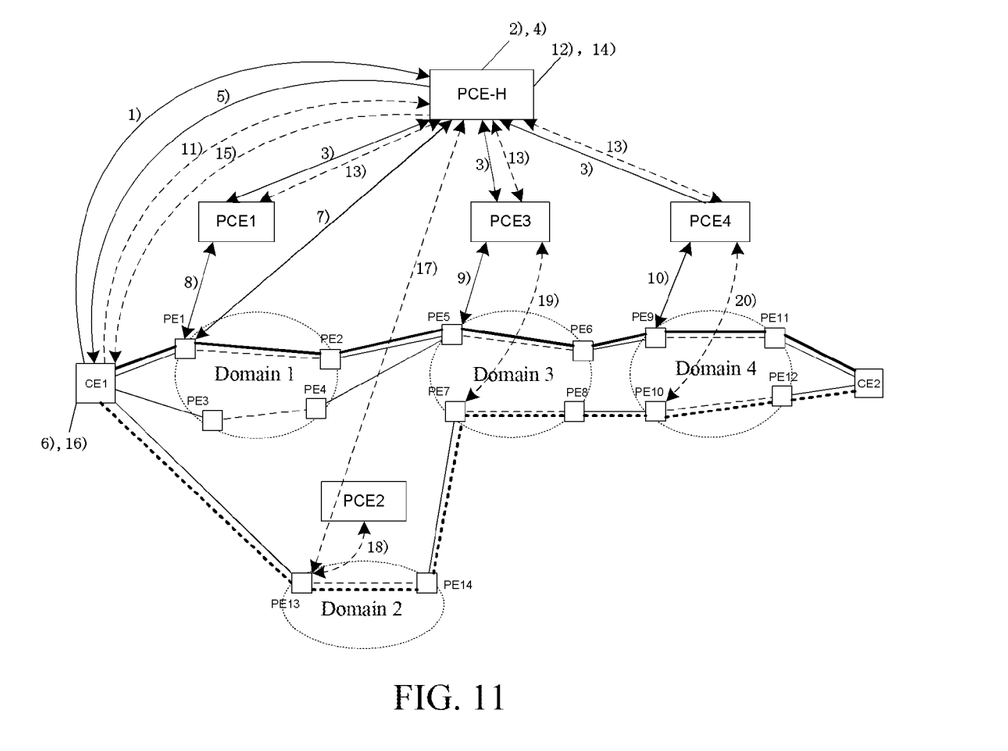
FIG. 11 illustrates a schematic diagram of computing domain-separating and dual-home paths according to alternative embodiment 2 of the present disclosure.

Embodiment 2: A Domain-Separating Dual-Home Path is Computed by Adopting the Method Provided by the Embodiment of the Present Disclosure As illustrated in FIG. 11, the following definitions are made:

Domain1, Domain2, Domain3 and Domain4 are respectively four domains and PCEs thereof are respectively PCE1, PCE2, PCE3 and PCE4. PCE-H represents high-layer PCE which establishes sessions with each of child PCEs. CE1 and CE2 are respectively client network edge equipment and used for initiating service establishment requests. PE1 . . . PE14 are serving network edge equipment. Specific steps are as follows.

In step 1, CE1 initiates a request PCReq for establishing an end-to-end path P1 from CE1 to CE2 to PCE-H.

In step 2, PCE-H computes a domain sequence from CE1 to CE2 according to an inter-domain topology, and obtains the domain sequence which is CE1-PE1-PE2-PE5-PE6-PE9-PE 11-CE2.

In step 3, PCE-H respectively sends a path computation request PCReq for decomposing the domain sequence into PE1-PE-2, PE5-PE6 and PE9-PE11 to PCE1, PCE3 and PCE4 to obtain paths which are respectively PE1-pathkey1-PE2, PE5-pathkey3-PE6 and PE9-pathkey4-PE11, and the paths are returned to PCE-H.

In step 4, PCE-H joints the paths to obtain an end-to-end path P1=CE1-PE1-pathkey1-PE2-PE5-pathkey3-PE6-PE9-pathkey4-PE11-CE2. A serving network path section PE1-pathkey1-PE2-PE5-pathkey3-PE6-PE9-pathkey4-PE11 is encrypted to be pathkeyH.

In step 5, PCE-H returns the path P1=CE1-PE1-pathkeyH-CE2 to CE1.

In step 6, PCE-H initiates establishment of signaling of P1 according to a route of P1.

In step 7, the signaling reaches PE1, PE1 queries pathkeyH from PCE-H to obtain a serving network path PE1-pathkey1-PE2-PE5-pathkey3-PE6-PE9-pathkey4-PE11, and the path is returned to PE1.

In step 8, PE1 requests PCE1 to query a plaintext path of pathkey1 and the signaling is routed to a node PE5 according to the obtained path.

In step 9, PE5 requests PCE3 to query a plaintext path of pathkey3 and the signaling is routed to a node PE9 according to the obtained path.

In step 10, PE9 requests PCE4 to query a plaintext path of pathkey4 and the signaling is routed to a node CE2 according to the obtained path, such that the establishment of the signaling of the path P1 is completed.

In step 11, CE1 initiates a request PCReq for establishing an end-to-end path P2 from CE1 to CE2, herein the request carries the path P1=CE1-PE1-pathkeyH-CE2.

In step 12, PCE-H performs query according to pathkeyH in the path P1 to obtain a serving network full path which is P1=CE1-PE1-pathkey1-PE2-PE5-pathkey2-PE6-PE9-pathkey3-PE11-CE2. The domain sequence, i.e., CE1-PE1-PE2-PE5-PE6-PE9-PE11 in P1 is extracted, and a domain sequence of the dual-home path P2 is computed by using the domain sequence in P1 as a separating condition, herein the obtained domain sequence is CE1-PE13-PE14-PE7-PE8-PE10-PE12-CE2.

In step 13, PCE-H respectively sends a path computation request PCReq for decomposing the domain sequence into PE13-PE14, PE7-PE8 and PE10-PE12 to PCE2, PCE3 and PCE4 to obtain paths which are respectively PE13-pathkey2-PE14, PE7-pathkey3'-PE8 and PE10-pathkey3'-PE12, and the paths are returned to PCE-H.

In step 14, PCE-H joints the paths to obtain an end-to-end path P2=CE1-PE13-pathkey2-PE14-PE7-pathkey3'-PE8-PE10-pathkey4'-PE12-CE2. A serving network path section PE13-pathkey2-PE14-PE7-pathkey3'-PE8-PE10-pathkey4'-PE12 is encrypted to be pathkeyH'.

In step 15, PCE-H returns the path P2=CE1-PE13-pathkeyH'-CE2 to CE1.

In step 16, PCE-H initiates establishment of signaling of P2 according to a route of P2.

In step 17, the signaling reaches PE3, PE3 queries pathkeyH' from PCE-H to obtain a serving network path PE13-pathkey2-PE14-PE7-pathkey3'-PE8-PE10-pathkey4'-PE12, and the path is returned to PE3.

In step 18, PE3 requests PCE1 to query a plaintext path of pathkey1' and the signaling is routed to a node PE7 according to the obtained path.

In step 19, PE7 requests PCE2 to query a plaintext path of pathkey2' and the signaling is routed to a node PE10 according to the obtained path.

In step 20, PE10 requests PCE3 to query a plaintext path of pathkey3' and the signaling is routed to the node CE2 according to the obtained path, such that the establishment of the signaling of the path P2 is completed.

To sum up, by adopting the above-mentioned embodiments, alternative embodiments and implementation modes provided by the present disclosure, end-to-end paths between client networks can be directly established; to see from a comparison with the conventional method for establishing the dual-home path by designating the source PE node, by using the feature that the inter-domain topology of the parent PCE in the grade PCEs is visual and combining CE nodes and links into the inter-domain topology, end-to-end paths from CE to CE can be directly computed, and the optimum performance and success rate of path computation are greatly improved. In addition, various dual-home path computation scenarios including a scenario that the source PE node of the dual-home path 1 and the source PE node of the dual-home path 2 in dual-home path computation are not in the same domain can be supported. The method provided by the embodiment of the present disclosure is a relatively complete method for establishing a multi-domain and dual-home path, and has a better application prospect.

INDUSTRIAL APPLICABILITY

Through the embodiments of the present disclosure, by adopting the method that a client network sends information of a first dual-home path and a computation request of a dual-home separating path of the first dual-home path to a parent PCE of a serving network with which the client network is associated; the client network receives information of the dual-home separating path responded by the parent PCE, herein the information of the dual-home separating path is computed by the parent PCE at least according to the information of the first dual-home path; and the client network establishes a second dual-home path according to the information of the dual-home separating path, the problem that the establishment of the separating path fails for a reason that a PE source node is incorrectly designated because the client network cannot see the serving network topology is solved, and thereby the success rate of the establishment of the separating path is improved.

Obviously, one skilled in the art should understand that all modules or all steps of the present disclosure may be implemented by using general-purpose computing devices, they may be integrated in a single computing device or distributed on a network consisting of a plurality of computing devices, optionally they may be implemented by using program codes executable for computing devices, and thus they may be stored in memory devices and executed by computing devices, or they may be respectively manufactured into integrated circuit modules or a plurality of modules or steps thereof may be manufactured into a single integrated circuit module to implement. Therefore, the present disclosure is not limited to any specific combination of hardware and software.

The embodiments described above are just alternative embodiments of the present disclosure and are not used for limiting the present disclosure. For one skilled in the art, the present disclosure may have various modifications and variations. Any modification, equivalent replacement, improvement and the like made within the spirit and rule of the present disclosure shall be still included in the protection scope of the present disclosure.

What is claimed is:

1. A method for establishing a multi-domain and dual-home path, comprising:
    a client network sending information of a first dual-home path and a computation request of a dual-home separating path of the first dual-home path to a parent Path Computation Element PCE of a serving network with which the client network is associated;
    the client network receiving information of the dual-home separating path responded by the parent PCE, wherein the information of the dual-home separating path is computed by the parent PCE at least according to the information of the first dual-home path; and
    the client network establishing a second dual-home path according to the information of the dual-home separating path;
    wherein, after the client network sending the information of the first dual-home path and the computation request of the dual-home separating path of the first dual-home path to the parent PCE of the serving network with which the client network is associated, the method further comprises:
    the parent PCE receiving the computation request and the information of the first dual-home path;
    the parent PCE responding to the computation request, and computing the information of the dual-home separating path according to the information of the first dual-home path; and
    the parent PCE sending the information of the dual-home separating path to the client network;
    wherein the parent PCE responding the computation request, and computing the information of the dual-home separating path according to the information of the first dual-home path comprises:
    the parent PCE querying a plaintext inter-domain path of the first dual-home path according to the information of the first dual-home path and extracting a domain sequence according to the plaintext inter-domain path;

the parent PCE computing a boundary node sequence of domains through which the dual-home separating path passes according to an inter-domain topology of the serving network, an end-to-end topology consisting of head and tail Client Edges CEs of the first dual-home path and the domain sequence taken as a separating condition;

the parent PCE respectively sending a path computation request to each of child PCEs of the parent PCE according to the boundary node sequence;

the parent PCE performing jointing according to received path computation responses made by each of the child PCEs to obtain the information of the dual-home separating path; and the parent PCE sending the information of the dual-home separating path to the client network.

2. The method according to claim 1, wherein each of the child PCEs makes a response to the path computation request according to following policies:

under a situation that the dual-home separating path and the first dual-home path are overlapped in a domain governed by a current child PCE, the current child PCE performing avoidance processing on the dual-home separating path according to the information of the first dual-home path; and the current child PCE sending a path computation response obtained after the avoidance processing performing on the parent PCE.

3. The method according to claim 1, wherein, before the client network sending the information of the first dual-home path and the computation request of the dual-home separating path of the first dual-home path to the parent PCE of the serving network with which the client network is associated, the method further comprises:

the client network sending a computation request of the first dual-home path to the parent PCE;

the client network receiving the information of the first dual-home path responded by the parent PCE; and the client network establishing the first dual-home path according to the information of the first dual-home path.

4. The method according to claim 3, wherein, before the client network receiving the information of the first dual-home path responded by the parent PCE, the method further comprises:

the parent PCE receiving the computation request of the first dual-home path;

the parent PCE responding to the computation request of the first dual-home path, and computing a boundary node sequence of domains through which the first dual-home path passes according to an inter-domain topology of the serving network;

the parent PCE respectively sending a path computation request to each of child PCEs of the parent PCE according to the boundary node sequence;

the parent PCE respectively receiving path computation responses made by each of the child PCEs;

the parent PCE performing jointing according to the received path computation responses made by each of the child PCEs to obtain the information of the first dual-home path; and the parent PCE sending the information of the first dual-home path to the requester of the computation request of the first dual-home path.

5. A method for establishing a multi-domain and dual-home path, comprising:

a parent Path Computation Element PCE in a serving network receiving information of a first dual-home path and a computation request of a dual-home separating path of the first dual-home path;

the parent PCE responding to the computation request, and computing information of the dual-home separating path according to the information of the first dual-home path; and the parent PCE sending the information of the dual-home separating path to a requester of the computation request, wherein the information of the dual-home separating path is used by the requester to establish a second dual-home path;

wherein the parent PCE responding to the computation request, and computing information of the dual-home separating path according to the information of the first dual-home path comprises:

the parent PCE querying a plaintext inter-domain path of the first dual-home path according to the information of the first dual-home path and extracting a domain sequence according to the plaintext inter-domain path;

the parent PCE computing a boundary node sequence of domains through which the dual-home separating path passes according to an inter-domain topology of the serving network, an end-to-end topology consisting of head and tail Client Edges CEs of the first dual-home path and the domain sequence taken as a separating condition;

the parent PCE respectively sending a path computation request to each of child PCEs of the parent PCE according to the boundary node sequence;

the parent PCE performing jointing according to received path computation responses made by each of the child PCEs to obtain the information of the dual-home separating path; and the parent PCE sending the information of the dual-home separating path to the requester of the computation request of the dual-home separating path.

6. A device for establishing a multi-domain and dual-home path, located in a parent Path Computation Element PCE of a serving network, comprising:

a receiving module arranged to receive information of a first dual-home path and a computation request of a dual-home separating path of the first dual-home path;

a computation module arranged to respond to the computation request, and compute information of the dual-home separating path according to the information of the first dual-home path; and a sending module arranged to send the information of the dual-home separating path to a requester of the computation request, wherein the information of the dual-home separating path is used by the requester to establish a second dual-home path;

wherein the computation module is arranged to respond to the computation request and compute information of the dual-home separating path according to the information of the first dual-home path by:

querying a plaintext inter-domain path of the first dual-home path according to the information of the first dual-home path and extracting a domain sequence according to the plaintext inter-domain path;

computing a boundary node sequence of domains through which the dual-home separating path passes according to an inter-domain topology of the serving network, an end-to-end topology consisting of head and tail Client Edges CEs of the first dual-home path and the domain sequence taken as a separating condition;

respectively sending a path computation request to each of child PCEs of the parent PCE according to the boundary node sequence;

performing jointing according to received path computation responses made by each of the child PCEs to obtain the information of the dual-home separating path; and sending the information of the dual-home separating path to the requester of the computation request of the dual-home separating path.

7. A system for establishing a multi-domain and dual-home path, comprising a client network and a parent Path Computation Element PCE of a serving network with which the client network is associated, wherein the client network is configured to send information of a first dual-home path and a computation request of a dual-home separating path of the first dual-home path to the parent PCE;

the client network is configured to receive information of the dual-home separating path responded by the parent PCE, wherein the information of the dual-home separating path is computed by the parent PCE at least according to the information of the first dual-home path; and the client network is configured to establish a second dual-home path according to the information of the dual-home separating path;

wherein, after the client network sends the information of the first dual-home path and the computation request of the dual-home separating path of the first dual-home path to the parent PCE, the parent PCE is configured to:

receive the computation request and the information of the first dual-home path;

respond to the computation request, and compute the information of the dual-home separating path according to the information of the first dual-home path; and send the information of the dual-home separating path to the client network;

wherein the parent PCE is configured to respond the computation request, and compute the information of the dual-home separating path according to the information of the first dual-home path by:

querying a plaintext inter-domain path of the first dual-home path according to the information of the first dual-home path and extracting a domain sequence according to the plaintext inter-domain path;

computing a boundary node sequence of domains through which the dual-home separating path passes according to an inter-domain topology of the serving network, an end-to-end topology consisting of head and tail Client Edges CEs of the first dual-home path and the domain sequence taken as a separating condition;

respectively sending a path computation request to each of child PCEs of the parent PCE according to the boundary node sequence;

performing jointing according to received path computation responses made by each of the child PCEs to obtain the information of the dual-home separating path; and sending the information of the dual-home separating path to the client network.

* * * * *